(12) United States Patent
Seidel

(10) Patent No.: US 10,480,219 B2
(45) Date of Patent: Nov. 19, 2019

(54) METHOD AND APPARATUS FOR UPGRADING INK STAIN ANTITHEFT TAGS WITH RFID COMMUNICATIONS FUNCTION

(71) Applicant: Stuart Seidel, Boca Raton, FL (US)

(72) Inventor: Stuart Seidel, Boca Raton, FL (US)

(73) Assignee: All-Tag Corporation, Boca Raton, FL (US)

( * ) Notice: Subject to any disclaimer, the term of this patent is extended or adjusted under 35 U.S.C. 154(b) by 0 days.

(21) Appl. No.: 15/463,186

(22) Filed: Mar. 20, 2017

(65) Prior Publication Data

US 2019/0106910 A1   Apr. 11, 2019

(51) Int. Cl.
| | | |
|---|---|---|
| E05B 73/00 | (2006.01) | |
| G08B 15/02 | (2006.01) | |
| E05B 39/00 | (2006.01) | |
| G08B 13/24 | (2006.01) | |
| G06K 19/04 | (2006.01) | |
| G06K 19/077 | (2006.01) | |
| G06Q 10/08 | (2012.01) | |
| G06Q 30/06 | (2012.01) | |

(52) U.S. Cl.
CPC ........ *E05B 73/0017* (2013.01); *E05B 39/002* (2013.01); *G06K 19/04* (2013.01); *G06K 19/07758* (2013.01); *G08B 13/2462* (2013.01); *G08B 15/02* (2013.01); *G06Q 10/087* (2013.01); *G06Q 30/06* (2013.01)

(58) Field of Classification Search
CPC .. E05B 73/00; E05B 73/0017; E05B 73/0023; E05B 73/0047
See application file for complete search history.

(56) References Cited

U.S. PATENT DOCUMENTS

| | | |
|---|---|---|
| 4,944,075 A | 7/1990 | Hogan |
| 5,022,244 A | 6/1991 | Charlot, Jr. |
| 5,031,287 A | 7/1991 | Charlot, Jr. |
| 5,045,172 A | 9/1991 | Guzman |
| 5,069,047 A | 12/1991 | Lynch et al. |
| 5,275,122 A | 1/1994 | Stolz et al. |
| 5,347,262 A | 9/1994 | Thurmond et al. |
| 5,372,020 A | 12/1994 | Stoltz et al. |
| 5,392,620 A | 2/1995 | Stoltz et al. |
| 5,438,738 A | 8/1995 | Stolz et al. |
| RE35,361 E | 10/1996 | Hogan et al. |
| 5,953,799 A | 9/1999 | Seidel |
| 8,089,362 B2 * | 1/2012 | Chamandy ............. G01V 15/00 340/572.1 |
| 9,598,882 B2 * | 3/2017 | Prat ................... E05B 73/0017 |
| 9,836,934 B2 * | 12/2017 | Joseph ............... G06Q 10/0833 |
| 2012/0102802 A1 * | 5/2012 | Lodi .................. E05B 73/0017 40/662 |

(Continued)

*Primary Examiner* — Christopher J Boswell (74) *Attorney, Agent, or Firm* — Breiner & Breiner, L.L.C.

(57) ABSTRACT

The invention provides an RFID circuit for use with new or pre-existing antitheft tags. An RFID pin replaces the current pin on antitheft tags that retailers already own. The RFID circuit is incorporated into or secured to, the pin structure. By replacing the current pin used on antitheft tags with a low cost RFID pin, existing antitheft tags can be inexpensively upgraded to antitheft tags that are also capable of use as inventory management and/or enhanced theft control devices.

17 Claims, 8 Drawing Sheets

(56) References Cited

U.S. PATENT DOCUMENTS

2013/0118043 A1\* 5/2013 Favier ................... G09F 9/35
  40/471
2014/0373407 A1\* 12/2014 Favier ................... G09F 9/35
  40/518
2018/0121904 A1\* 5/2018 Martinez ............ G06Q 20/3278

\* cited by examiner

Figure 1

Prior Art

Figure 2

Prior Art

Figure 3

Prior Art

METHOD AND APPARATUS FOR UPGRADING INK STAIN ANTITHEFT TAGS WITH RFID COMMUNICATIONS FUNCTION

BACKGROUND OF THE INVENTION

Technical Field

This invention relates generally to ink stain antitheft tags used to deter the theft of articles by permanently staining the article if theft is attempted, thereby rendering the article useless, and further relates to an antitheft tag that provides conventional ink stain theft deterrence while simultaneously providing automated inventory management and control capability by way of an internal RFID tag. It provides antitheft protection and an RFID inventory control function that can be incorporated into the antitheft tag during initial manufacture of the ink stain antitheft tag or added later as an upgrade to prior art ink stain antitheft tags.

Background

Since the automated inventory management and control capability is an improvement to the functionality of existing antitheft tags, especially ink stain antitheft tags, a brief overview of prior art antitheft tag technology will be presented first.

In the retail security industry, conventional theft deterrent devices, commonly referred to as antitheft tags, are frequently attached to inventory items to combat retail theft, and are widely used due to their effectiveness. Antitheft tags are typically attached to articles that are easily removed from stores. The antitheft tags are attached in a readily visible manner such that a potential thief will be aware that the ink stain antitheft tag will render the item useless if stolen. The theory of deterrence being that the potential thief, recognizing that the article will be useless due to the permanent staining, will have no incentive to steal articles protected by these devices.

Reliability of these devices are important since, in order to deter, the potential thief must be confident that the device will function as intended if any unauthorized removal is attempted. Also, since the device will render the article useless if activated, it is necessary that the device not discharge the permanent staining substance unless unauthorized removal is attempted.

Other factors to be considered in the design of ink stain antitheft tags are the cost to manufacture, the weight of the device, and ease of determination of whether the device has been triggered. The device may be used in very high numbers in large stores. As a result, the cost to manufacture becomes an important consideration. In order to keep costs low, the design of the device should be kept simple.

The devices are often used on articles constructed of materials that are easily damaged. As a result, the device should be as light as possible, while maintaining reliability, in order not to damage the article to be protected.

Previous attempts have been made to provide ink stain antitheft tags such as are described in U.S. Pat. Nos. Re. 35,361, 5,045,172 and 4,944,075 to Hogan et al. (the '361, '172 and '075 patents); U.S. Pat. Nos. 5,438,738, 5,392,620, 5,275,122 and 5,372,020 to Stolz et al. (the '738, '620, '122 and '020 patents); U.S. Pat. No. 5,347,262 to Thurmond et al. (the '262 patent); U.S. Pat. Nos. 5,031,287 and 5,022,244 to Chariot et al. (the '287 and '244 patents); U.S. Pat. No. 5,069,047 to Lynch et al. (the '047 patent), U.S. Pat. No. 5,953,799 to Seidel (the named inventor herein), all of which are incorporated herein by reference.

The '738 patent describes an antitheft ink tag. The tag is composed of a base element, and a locking element. The locking element is attached to the base element by a connecting unit. The connecting unit is composed of an elongated pin. The base element contains a marking substance container (ink ampule) held in place by a tongue. An attempt to improperly remove the tag causes the head of the elongated pin to push the tongue into the ink ampules and fracture them.

The '361 and '172 patents describe antitheft ink tags. The tag is composed of a base component, and a locking component. The locking component is attached to the base component by a pin. The connecting pin has a pin head and a breaker element. The base component contains glass vials (ink ampules). An attempt to improperly remove the tag causes the pin head to push the breaker element into the ink ampules and fracture them.

The '075 patent describes an antitheft ink tag. The tag is composed of a base component and a locking component. The locking component is attached to the base component by a pin. The connecting pin has a pin head and breaking balls. The base component contains glass vials (ink ampules). An attempt to improperly remove the tag causes the pin head to push the breaking balls into the ink ampules and fracture them.

The '122 patent describes an antitheft ink tag. The tag is composed of a base element, and a locking element. The locking element is attached to the base element by a pin. The head of the connecting pin has an abutment part. The base element contains ink ampules. An attempt to improperly remove the tag causes the pin head and abutment part to push into the ink ampules and fracture them.

The above antitheft tags use a dye as the method for permanently staining the article to be protected. This method for rendering the article useless may not be completely effective as in some cases the dye may be removed from the article.

None of the devices described above, with the exception of the '799 patent to Seidel, describe an antitheft tag which effectively deters the theft of articles by permanently staining them yet is reliable, lightweight, simple and inexpensive to manufacture, effectively renders the article permanently useless if unauthorized removal is attempted, and provides its user an easy manner to determine if the device has been triggered.

As can be seen, there are many options available for merchants to use antitheft tags. In many retail situations merchant will have an antitheft tag on almost every item of inventory. The fact that merchants invest a substantial amount of money in ink stain antitheft tags, and have them on most, if not all, inventory creates a problem in that the merchant would be reluctant to bear the cost to replacing them if a technological improvement would present itself.

For example, since antitheft tags are already in place in most merchant stores, it would be desirable to add additional new technological functions to antitheft tags, whether they be new or preexisting, with a minimum amount of cost or design complications.

While the cost of antitheft tags can be substantial depending on the size of the merchant's establishment, there are other costs involved with keeping track of merchandise in addition to antitheft devices. Another substantial cost for merchants is the need to carefully monitor the merchant's inventory. Prior to the advances in electronics, inventory management was largely an expensive, time-consuming process based on manual labor. As the sophistication of electronics improved, and the cost of using that technology decreased, other solutions for managing inventory evolved.

A common solution was the use of barcodes on individual inventory items. These are barcodes provided enhancements and productivity. First, barcodes reduced the time needed to conduct manual inventories to a minimum by eliminating the need for employees to manually record each item of Inventory. Second, in conjunction with more sophisticated cash registers and checkout systems, the barcodes could automatically be read when a customer was checking out, and the inventory management system automatically updated at the checkout counter. As a result, the barcodes allow dynamic inventory tracking to be done without human intervention. This not only reduces the costs related to periodic inventories, but it also facilitates other inventory functions such as just-in-time delivery of new inventory.

While the prior art has provided a variety of solutions relating to inventory protection and management, it has failed to provide a unified solution that results in a net reduction in costs to the merchant or organization. Both antitheft technology and inventory management technology are important aspects of any retail business organization, as well as other environments such as manufacturing, corporate, government, military, etc. Further, the prior art has failed to provide an inexpensive method of upgrading pre-existing ink stain antitheft tags to add new technology to them without the expense of full replacement.

SUMMARY OF THE INVENTION

The present invention solves significant problems in the prior art by providing a reliable, inexpensive upgrade to antitheft tags that provides its user the ability to upgrade their existing inventory of antitheft tags such that new function can be incorporated without replacing the antitheft tags. As a result, the preexisting antitheft tag can be upgraded to function both as a theft prevention device and as an effective and inexpensive inventory management tool. The invention uses an RFID pin (containing an RFID circuit) that is embedded into the securing pin of the antitheft tags. In particular, an RFID Pin replaces the securing pin on the antitheft tags that retailers already own. By replacing the securing pin used on antitheft tags with an RFID pin that includes a low cost RFID circuit, existing antitheft tags can be inexpensively upgraded to antitheft tags that are also capable of use as inventory management devices.

DESCRIPTION OF THE PREFERRED EMBODIMENT

Before discussing the figures, a brief overview of the invention will be provided. The invention provides an inexpensive way to upgrade ink-stain antitheft tags with RFID circuits such that pre-existing ink stain tags can also communicate with point of sales terminals, etc. The invention provides an upgrade to pre-existing ink stain antitheft tags in the form of an RFID pin that replaces the prior art securing pin. The RFID pin contains an RFID circuit that is incorporated into the securing pin. When an antitheft tag is upgraded, the prior art securing pin is replaced with an RFID pin. As a result, the upgrade pf a simple inexpensive part eliminates the necessity of replacing the entire ink stain antitheft tag with new antitheft tag. This substantially reduces the cost of adding new function to pre-existing antitheft tags. In large merchants, there may be a very large number of pre-existing tags in use, and as a result, the cost of replacing the entire tag inventory would be prohibitive. Of course, for new ink stain antitheft tags, the RFID pin would be installed at the point of manufacture. We turn now to a discussion of the figures.

Figure 1:
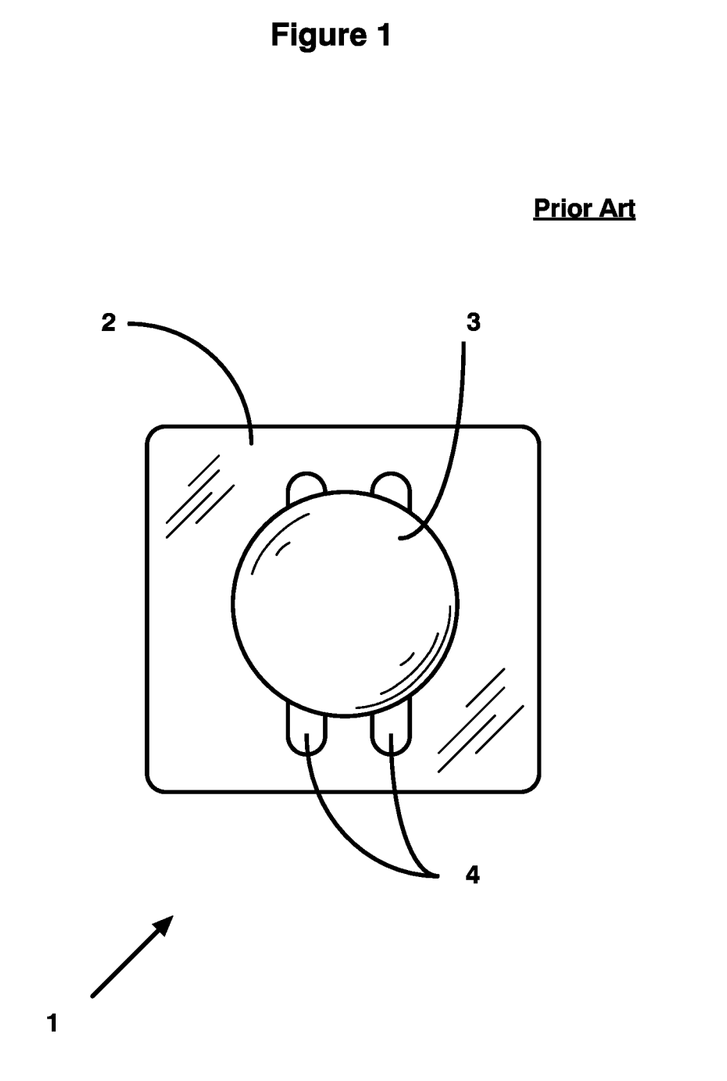
FIG. 1 is a transparent bottom view of a prior art ink stain antitheft tag with a securing clip.

FIG. 1 is a transparent bottom view of a prior art ink stain antitheft tag 1 with a securing clip 3 attached to the ink stain antitheft tag 1. In this embodiment, the body 2 of the antitheft tag 1 is shown with a securing clip 3 attached to the securing pin 5 (shown below in FIG. 2). For ease of illustration, the body 2 of antitheft tag 1 is shown as a transparent view to illustrate the location of the ink ampules 4 that are inside the body 2. In normal use, the securing pin 5 is inserted into an article 7 (shown below in FIGS. 6 and 8) to be protected and then secured to the article 7 by securing clip 3.

Figure 2:
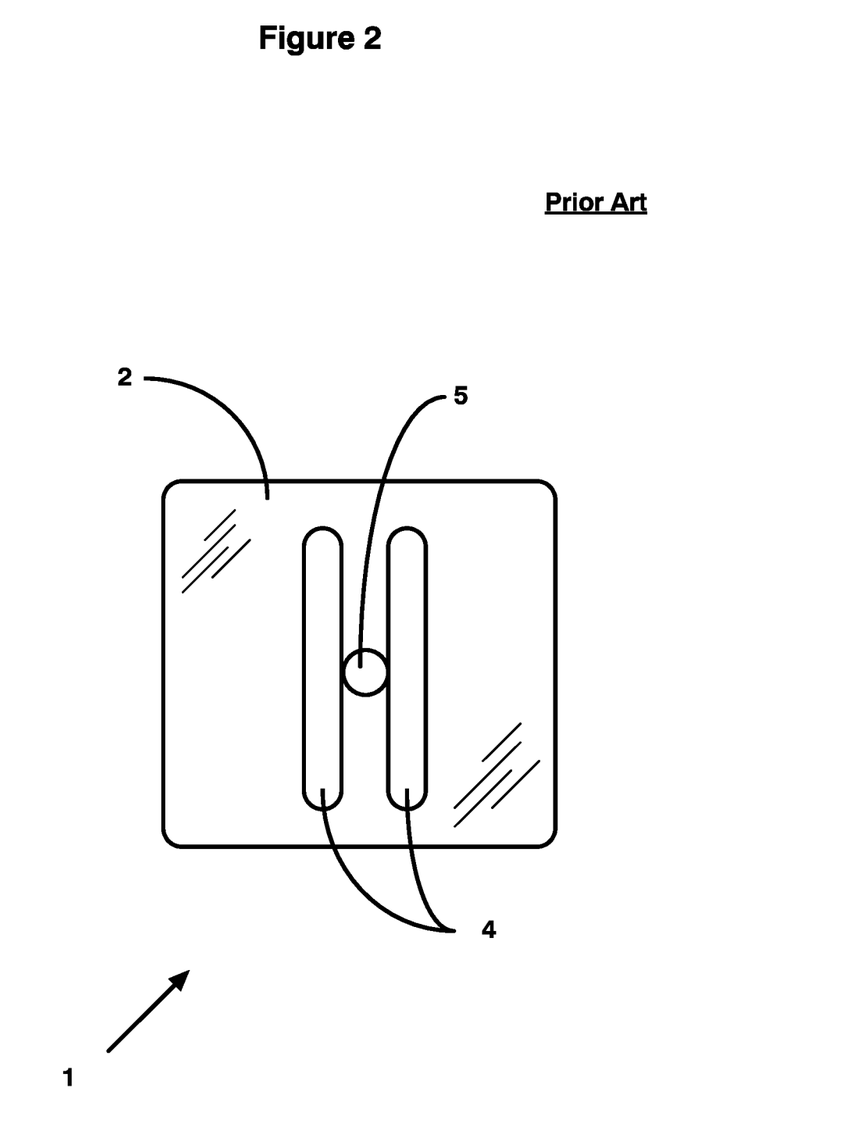
FIG. 2 is a transparent bottom view of a prior art ink stain antitheft tag with the securing clip removed to show the ink ampules and the retaining pin.

FIG. 2 is a transparent bottom view of the prior art ink stain antitheft tag 1 shown in FIG. 1 with the securing clip 3 removed to show the ink ampules 4 and the securing pin 5. In this figure, the antitheft tag 1 is shown having a substantially rectangular shape. However, those skilled in the art will recognize that any suitable shape can be used, such as circles, irregular shapes, etc. In prior art ink stain antitheft tags, the pin is placed in the antitheft tag such that if the tag is forcibly removed, the ink ampules will be broken and the ink released, As a result, the attached article is no longer usable by the thief.

Figure 3:
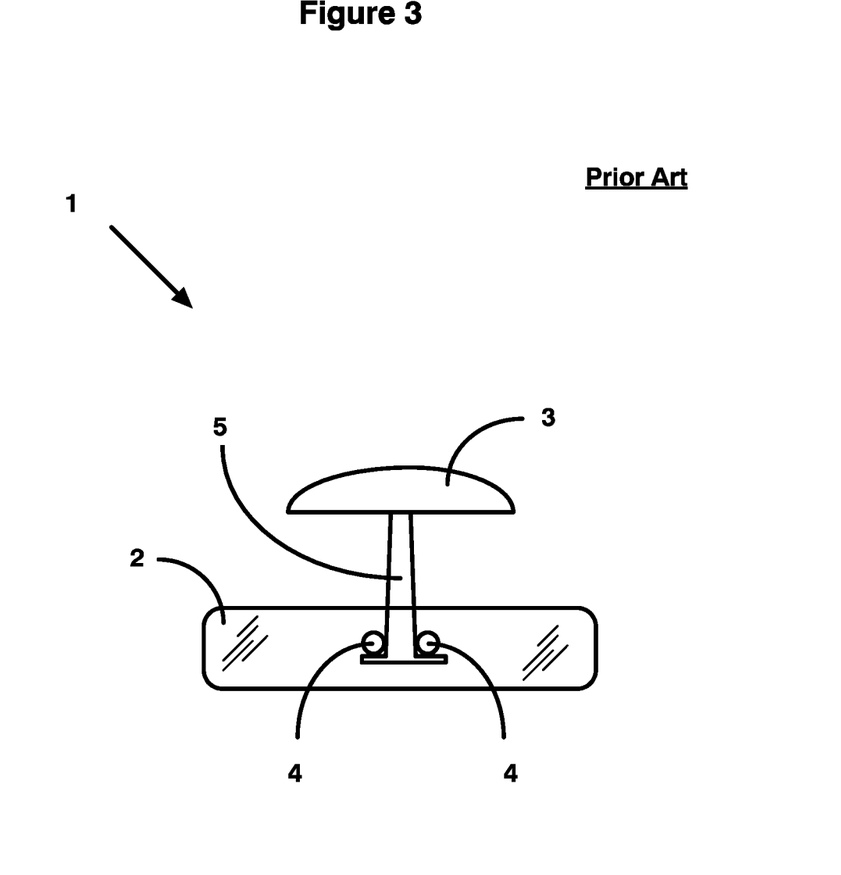
FIG. 3 is a transparent edge view of a prior art ink stain antitheft tag with the securing clip removed to show the ink ampules and the retaining pin.

FIG. 3 is a transparent edge view of the prior art ink stain antitheft tag 1 of FIGS. 1-2 with the securing clip 3 removed to show the ink ampules 4 and the securing pin 5. In this figure, the securing clip 3 is not shown. For ease of illustration, it should be understood that the shape, dimensions and size of the antitheft tag 1 can vary to suit design choices.

Figure 4:
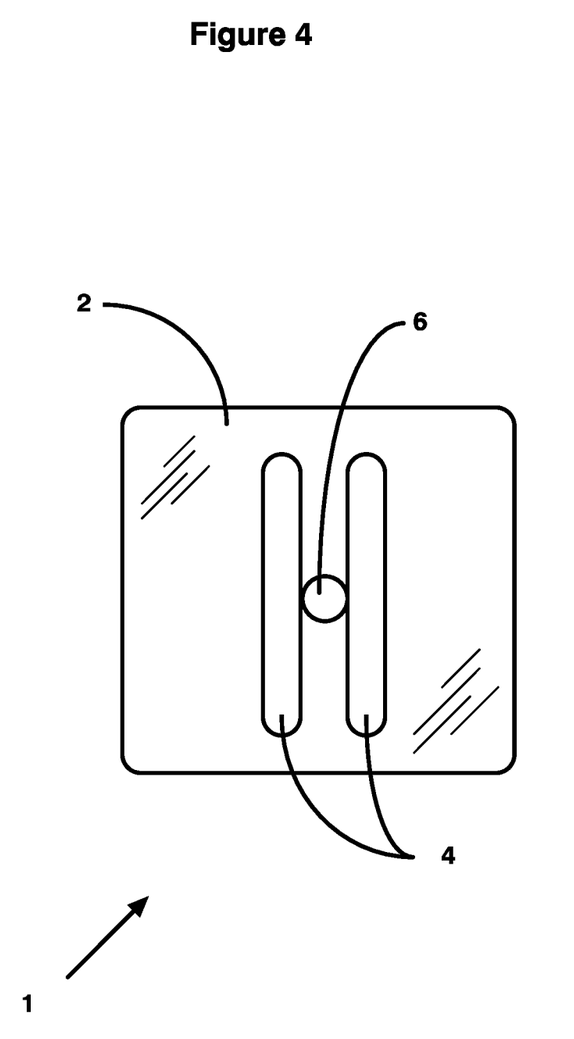
FIG. 4 is a transparent bottom view of an ink stain antitheft tag with the securing clip removed and showing the ink ampules, and the RFID pin.

FIG. 4 is a transparent bottom view of a preferred embodiment of the ink stain antitheft tag 1 with the securing clip 3 removed and showing the ink ampules 4, the RFID pin 6. By replacing the prior art securing pin 5 with an RFID pin 6, a prior art antitheft tag 1 can be upgraded to an intelligent antitheft tag 1 that can transfer information to external devices, such as cash registers, point of sale terminals, theft detection devices, etc. As a result, merchants desiring to add new function, such as an RFID based inventory control function to their antitheft tags, can do so at minimal cost. Without the upgrade capability provided by the invention, the addition of the RFID feature would require a complete replacement of the antitheft tag 1 at much greater cost. For large merchant enterprises, using many thousands of these devices, the total cost can be significant.

Figure 5:
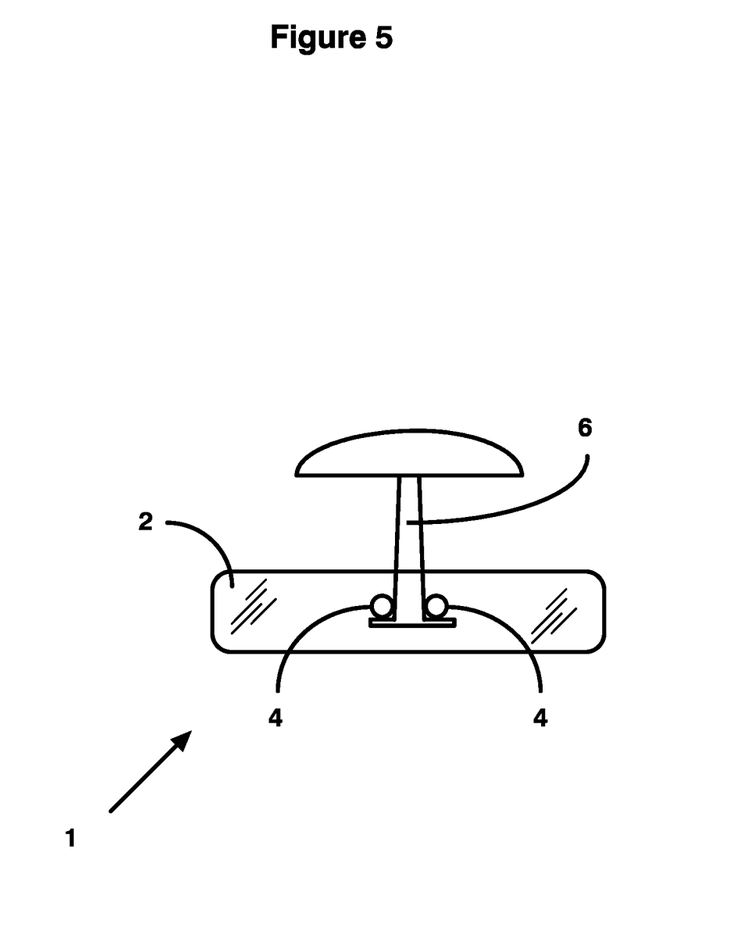
FIG. 5 is a transparent edge view of an ink stain antitheft tag with the securing clip removed and showing the ink ampules, and the RFID pin.

FIG. 5 is a transparent edge view of an ink stain antitheft tag with the securing clip 3 removed and showing the ink ampules 4, and an RFID pin 6. For ease of illustration, the article 7 that is protected by the antitheft tag 1 is not shown in this figure.

Figure 6:
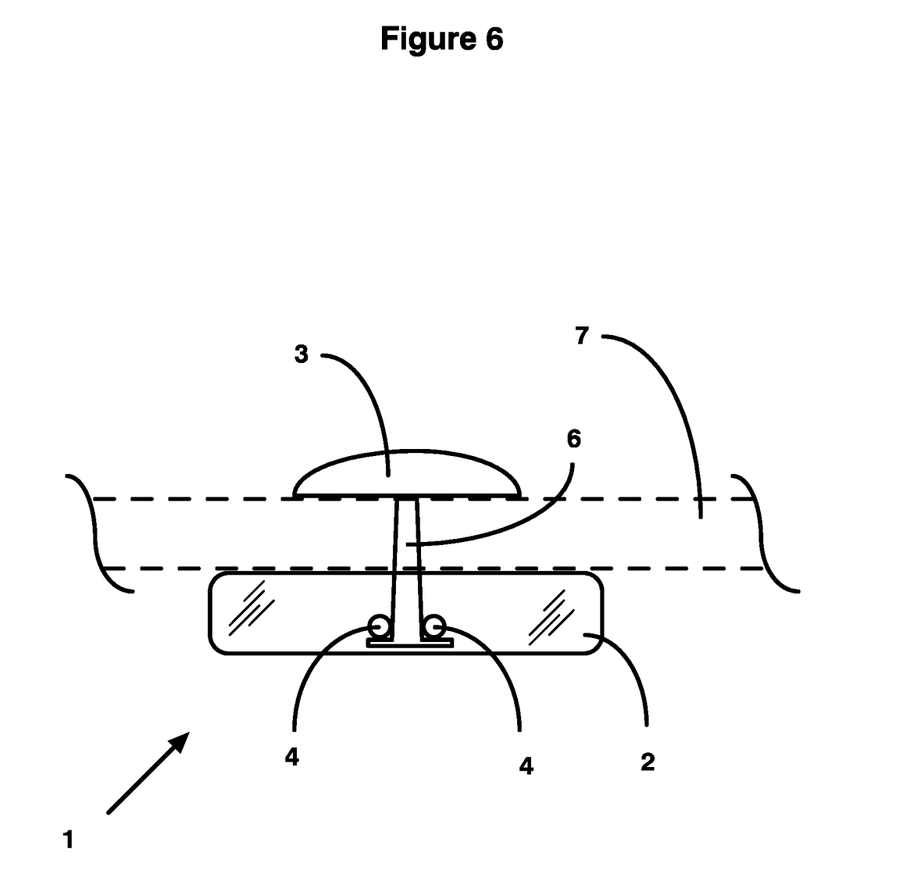
FIG. 6 is a transparent edge view of an ink stain antitheft tag showing the ink ampules, and the antitheft tag that secures to the RFID pin of the ink ampules.

FIG. 6 is a transparent edge view of an ink stain antitheft tag 1 showing the ink ampules 4, and a securing clip 3 that attaches to the RFID pin 6. In addition, the article 7 is also shown.

Figure 7:
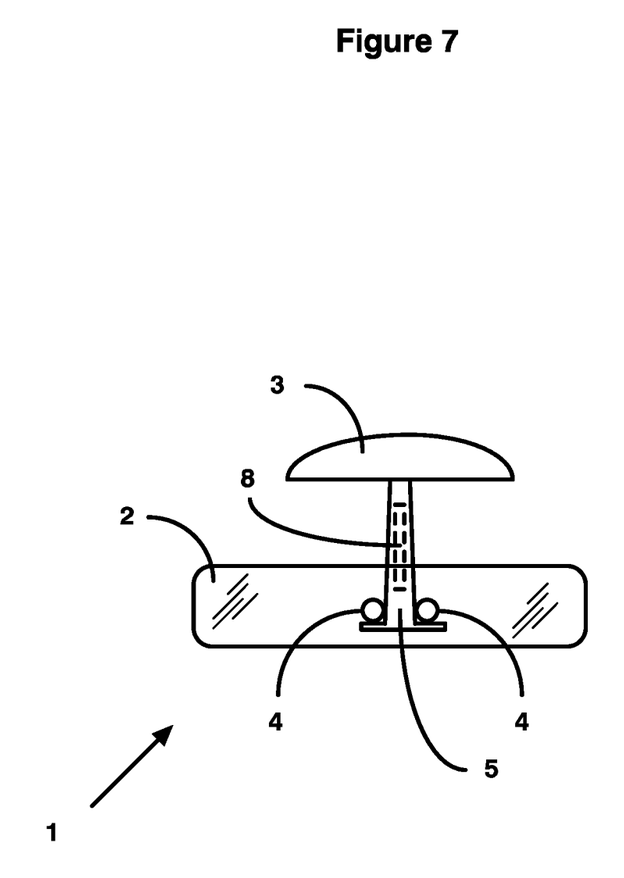
FIG. 7 is a transparent edge view of an ink stain antitheft tag with the securing clip removed and showing the ink ampules, the RFID pin with the RFID tag embedded in it.

FIG. 7 is a transparent edge view of an alternative preferred embodiment of the ink stain antitheft tag 1 with the securing clip 3 removed and showing the ink ampules 4, and an RFID pin 6 with embedded RFID circuit 8.

Figure 8:
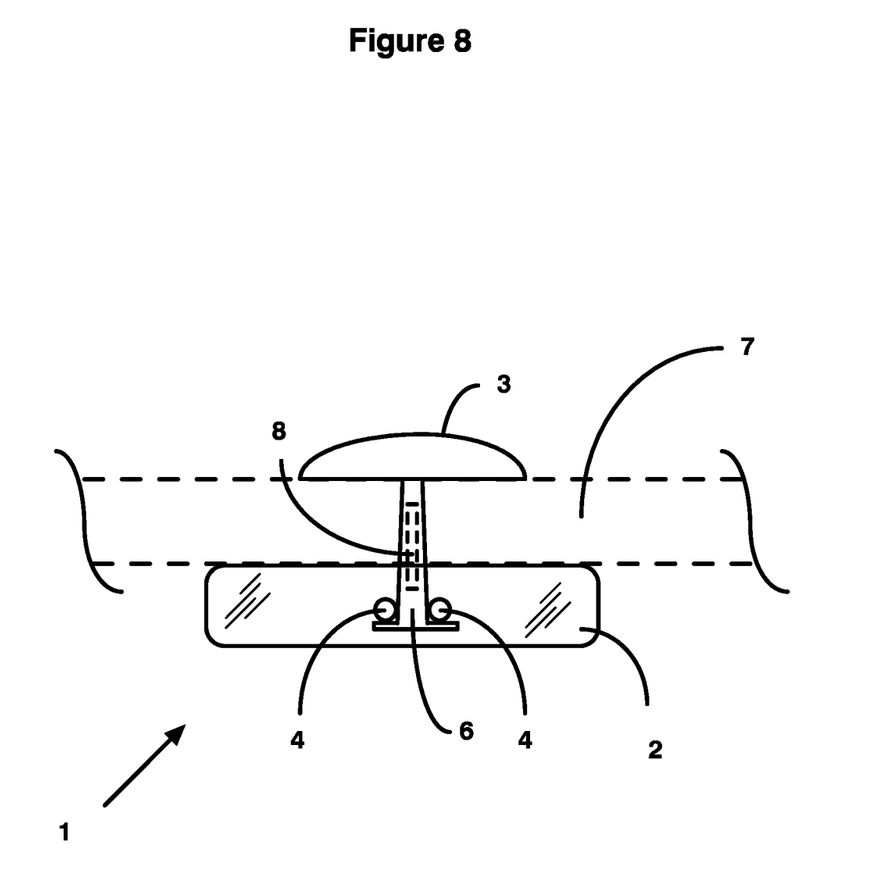
FIG. 8 is a transparent edge view of an ink stain antitheft tag showing the ink ampules, the securing clip, the RFID pin with the RFID tag embedded inside it.

FIG. 8 is a transparent edge view of the embodiment of FIG. 7 showing the ink stain antitheft tag 1 with the securing clip 3 attached and showing the ink ampules 4, the RFID pin 6 with an RFID circuit 8 embedded inside the RFID pin 6. Article 7 is also shown.

As can be seen from the foregoing, existing conventional antitheft tags 1 can be easily and inexpensively upgraded to a dual function antitheft tag that serves its original antitheft purpose while simultaneously providing an additional inventory management function. This is accomplished by merely replacing the prior art securing pin 3 with the enhanced RFID pin 6 provided by the invention. As a result, the merchant does not have to incur the costs of replacing the entire antitheft tag 1 when upgrading the merchant's system.

It should be noted that the antitheft tag 1 used in the foregoing embodiments was used for the purpose of describing the invention, but the invention can be implemented on any antitheft tag that uses a securing pin, such as the one shown, audible antitheft tags, ink based antitheft tags, etc.

While the invention has been described with respect to a preferred embodiment thereof, it will be understood by those skilled in the art that various changes in detail may be made therein without departing from the spirit, scope, and teaching of the invention. For example, the material used to fabricate the device can vary, etc. Accordingly, the invention herein disclosed is to be limited only as specified in the following claims.

I claim:

1. A device for deterring theft of an article, comprising:
   a plurality of ampules;
   a permanent staining substance to be contained in said ampules, said permanent staining substance is of the type that changes the composition of the article;
   a housing which encloses said ampules, said housing comprising a base component supporting said ampules and a cover component to cover said base component;
   a means to allow said permanent staining substance to escape if said ampules are fractured;
   an elongated pin type connecting unit extending from the housing; and
   an RFID circuit within said housing, said RFID circuit comprising
   an integrated chip and an antenna;
   wherein said device is adapted to be attached to a locking unit to secure said device to said article.
2. The device of claim 1, wherein said means to allow said permanent staining substance to escape if said ampules are fractured comprises a plurality of holes which allow said permanent staining substance to escape if said ampules are fractured.
3. The device of claim 1, further comprising a break away element in said cover compartment.
4. The device of claim 3, wherein said base component has a centrally located hole which supports said elongated pin type connecting unit.
5. The device of claim 3, wherein said break away element of said cover component is permanently attached to said elongated pin type connecting unit.
6. The device of claim 5, wherein said break away element causes said ampules to fracture if unauthorized removal of said device is attempted.
7. The device of claim 6 further comprising a means for detecting the escape of said permanent staining substance.
8. The device of claim 7, wherein said means for detecting the escape of said permanent staining substance comprises a viewing hole in said cover component, said viewing hole resulting from the breaking away of said break away element.
9. The device of claim 1, further comprising said locking unit.
10. A method of upgrading an ink-stain antitheft tag comprising a conventional ink-stain pin and a locking unit to thereby provide additional technological functions to the ink-stain antitheft tag comprising the steps of
    (a) separating the conventional ink-stain pin from the locking unit of the ink-stain antitheft tag,
    (b) replacing the conventional ink-stain pin with a new ink-stain pin comprising
    a plurality of ampules;
    a permanent staining substance to be contained in said ampules, said permanent staining substance is of the type that changes the composition of the article;
    a housing which encloses said ampules, said housing comprising a base component supporting said ampules and a cover component to cover said base component;
    a means to allow said permanent staining substance to escape if said ampules are fractured;
    an elongated pin type connecting unit extending from the housing; and
    an RFID circuit within said housing, said RFID circuit comprising
    an integrated chip and an antenna;
    wherein said new ink-stain pin is adapted to be attached to said locking unit, and
    (c) wherein the upgraded ink-stain anti-theft tag is adapted to be attached to an article and provide additional technological functions to the anti-theft tag.
11. The method of claim 10, wherein said means to allow said permanent staining substance to escape if said ampules are fractured comprises a plurality of holes which allow said permanent staining substance to escape if said ampules are fractured.
12. The method of claim 10, further comprising a break away element in said cover compartment.
13. The method of claim 12, wherein said base component has a centrally located hole which supports said elongated pin type connecting unit.
14. The method of claim 12, wherein said break away element of said cover component is permanently attached to said elongated pin type connecting unit.
15. The method of claim 14, wherein said break away element causes said ampules to fracture if unauthorized removal of said device is attempted.

16. The method of claim 15, further comprising a means for detecting the escape of said permanent staining substance.

17. The method of claim 16, wherein said means for detecting the escape of said permanent staining substance comprises a viewing hole in said cover component, said viewing hole resulting from the breaking away of said break away element.

* * * * *